(12) United States Patent
Suzuki et al.

(10) Patent No.: US 11,891,556 B2
(45) Date of Patent: Feb. 6, 2024

(54) NITRIDE PHOSPHOR, METHOD FOR MANUFACTURING THE SAME, AND LIGHT EMITTING DEVICE

(71) Applicant: NICHIA CORPORATION, Anan (JP)

(72) Inventors: Shigeyuki Suzuki, Tokushima (JP); Hiroyuki Watanabe, Itano-gun (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 0 days.

(21) Appl. No.: 18/304,004

(22) Filed: Apr. 20, 2023

(65) Prior Publication Data

US 2023/0250335 A1  Aug. 10, 2023

Related U.S. Application Data

(62) Division of application No. 17/806,442, filed on Jun. 10, 2022, now Pat. No. 11,692,135.

(30) Foreign Application Priority Data

Jun. 11, 2021 (JP) ................................. 2021-098090
Oct. 13, 2021 (JP) ................................. 2021-168122

(51) Int. Cl.
*B22F 3/10* (2006.01)
*C09K 11/77* (2006.01)

(52) U.S. Cl.
CPC ...... *C09K 11/77348* (2021.01); *B22F 3/1017* (2013.01); *C09K 11/7731* (2013.01); *C09K 11/7739* (2013.01); *C09K 11/77346* (2021.01); *C09K 11/77347* (2021.01)

(58) Field of Classification Search
CPC ............. B22F 3/1017; C09K 11/77348; C09K 11/77347; C09K 11/77346
USPC ......................................................... 313/503
See application file for complete search history.

(56) References Cited

U.S. PATENT DOCUMENTS

| | | |
|---|---|---|
| 5,936,346 A | 8/1999 | Ishihara et al. |
| 11,031,529 B2 | 6/2021 | Martiny et al. |
| 2006/0124947 A1 | 6/2006 | Mueller et al. |
| 2009/0267485 A1 | 10/2009 | Nagatomi et al. |
| 2010/0308712 A1 | 12/2010 | Liu et al. |
| 2015/0361339 A1 | 12/2015 | Pohl-Klein et al. |

(Continued)

FOREIGN PATENT DOCUMENTS

| | | |
|---|---|---|
| JP | 2006169526 A | 6/2006 |
| JP | 2012512307 A | 5/2012 |

(Continued)

*Primary Examiner* — Christopher M Raabe
(74) *Attorney, Agent, or Firm* — Hunton Andrews Kurth LLP

(57) ABSTRACT

A nitride phosphor having a composition containing Eu, Si, Al, N, and a group 2 element including at least one selected from the group consisting of Mg, Ca, Sr, and Ba. In the composition, a ratio of a total molar content of the group 2 element and Eu to a molar content of Al is 0.8 or more and 1.1 or less, a molar ratio of Eu is 0.002 or more and 0.08 or less, a molar ratio of Si is 0.8 or more and 1.2 or less, and a total molar ratio of Si and Al is 1.8 or more and 2.2 or less. The nitride phosphor has a first peak in a range of 17° 2θ or more and 19° 2θ or less and a second peak in a range of 34° 2θ or more and 35.5° 2θ or less in a CuKα powder X-ray diffraction pattern.

7 Claims, 7 Drawing Sheets

(56) References Cited

U.S. PATENT DOCUMENTS

| | | |
|---|---|---|
| 2016/0040063 A1 | 2/2016 | Shimooka et al. |
| 2016/0115384 A1 | 4/2016 | Todorov et al. |
| 2019/0010395 A1 | 1/2019 | Schmidt et al. |
| 2019/0062633 A1* | 2/2019 | Wakui .................. H01L 33/502 |
| 2019/0233726 A1 | 8/2019 | Abe et al. |
| 2020/0251619 A1 | 8/2020 | Nomiyama et al. |
| 2022/0367760 A1 | 11/2022 | Toyoshima et al. |
| 2022/0396731 A1 | 12/2022 | Suzuki et al. |

FOREIGN PATENT DOCUMENTS

| | | |
|---|---|---|
| JP | 2013185011 A | 9/2013 |
| JP | 2013249466 A | 12/2013 |
| JP | 2015028983 A | 2/2015 |
| JP | 2016506976 A | 3/2016 |
| JP | 2018021167 A | 2/2018 |
| JP | 2018150432 A | 9/2018 |
| JP | 2019509513 A | 4/2019 |
| JP | 2020012010 A | 1/2020 |
| JP | 2020109850 A | 7/2020 |
| JP | 2020172572 A | 10/2020 |
| WO | 2007037059 A1 | 4/2007 |
| WO | 2014123198 A1 | 8/2014 |
| WO | 2015001860 A1 | 1/2015 |
| WO | 2019073864 A1 | 4/2019 |
| WO | 2020209055 A1 | 10/2020 |

* cited by examiner

NITRIDE PHOSPHOR, METHOD FOR MANUFACTURING THE SAME, AND LIGHT EMITTING DEVICE

CROSS-REFERENCE TO RELATED APPLICATIONS

This is a divisional application of U.S. patent application Ser. No. 17/806,442, filed Jun. 10, 2022, which claims priority to Japanese patent Application No. 2021-098090, filed on Jun. 11, 2021, and Japanese patent Application No. 2021-168122, filed on Oct. 13, 2021, the contents of which are hereby incorporated by reference in their entirety.

BACKGROUND

Field of the Invention

The present disclosure relates to a nitride phosphor, a method for producing the same, and a light emitting device.

Description of the Related Art

Light emitting devices obtained by combining light emitting diodes (hereinafter referred to as "LEDs") and phosphors are actively applied to lighting devices, backlights of liquid crystal display devices, etc. Examples of phosphors used in the light emitting devices include a nitride phosphor having a composition containing nitrogen, and known examples thereof are a red phosphor using $CaAlSiN_3$ as a parent crystal and activated with $Eu^{2+}$ (hereinafter referred to as "CASN phosphor") and $(Sr, Ca)AlSiN_3$:Eu having a portion of Ca of the CASN phosphor replaced with Sr (hereinafter referred to as "SCASN phosphor"). The CASN phosphor and the SCASN phosphor had peak emission wavelengths included in a wide range from 600 nm to 670 nm depending on a composition thereof. These nitride phosphors are useful for improving color rendering properties of lighting devices (see, e.g., WO 2015/001860).

For example, in WO 2015/001860, a manufacturing method for adjusting a charged composition of a raw material for a phosphor is proposed as a method for manufacturing a nitride phosphor for the purpose of improving the emission intensity.

SUMMARY

A first embodiment provides a nitride phosphor having a composition containing Eu, Si, Al, N, and a group 2 element including at least one selected from the group consisting of Mg, Ca, Sr, and Ba, wherein in the composition, a ratio of a total molar content of the group 2 element and Eu to a molar content of Al is 0.8 or more and 1.1 or less, a molar ratio of Eu is 0.002 or more and 0.08 or less, a molar ratio of Si is 0.8 or more and 1.2 or less, and a total molar ratio of Si and Al is 1.8 or more and 2.2 or less. In the nitride phosphor, when a value is obtained by dividing a maximum value of peak intensity in a range of 34° 2θ or more and 35.5° 2θ or less by a maximum value of peak intensity in a range of 17° 2θ or more and 19° 2θ or less in a powder X-ray diffraction pattern measured by using a CuKα ray, the value is 3.0 or more and 5.5 or less.

A second embodiment provides a light emitting device including a fluorescent member containing the nitride phosphor according to the first embodiment and a light emitting element having a peak emission wavelength in a range of 365 nm or more and 500 nm or less.

A third embodiment provides a method for manufacturing a nitride phosphor having a composition containing Eu, Si, Al, N, and a group 2 element including at least one selected from the group consisting of Mg, Ca, Sr, and Ba, the composition having a ratio of a total molar content of the group 2 element and Eu to a molar content of Al of 0.8 or more and 1.1 or less, a molar ratio of Eu of 0.002 or more and 0.08 or less, a molar ratio of Si of 0.8 or more and 1.2 or less, and a total molar ratio of Si and Al of 1.8 or more and 2.2 or less. The method for manufacturing a nitride phosphor includes: performing a first heat treatment of a raw material mixture containing a group 2 element source, an Eu source, a Si source, and an Al source in a closed container made of tungsten at a temperature of 1200° C. or higher and 1600° C. or lower to obtain a first heat-treated product; and performing a second heat treatment of the first heat-treated product in a closed container made of tungsten at a temperature of 1800° C. or higher and 2100° C. or lower to obtain a second heat-treated product.

A fourth embodiment provides a method for manufacturing a nitride phosphor having a composition containing a group 2 element including Eu, Si, Al, N, and at least one selected from the group consisting of Mg, Ca, Sr, and Ba, the composition having a ratio of a total molar content of the group 2 element and Eu to a molar content of Al of 0.8 or more and 1.1 or less, a molar ratio of Eu of 0.002 or more and 0.08 or less, a molar ratio of Si of 0.8 or more and 1.2 or less, and a total molar ratio of Si and Al of 1.8 or more and 2.2 or less. The method for manufacturing a nitride phosphor includes performing a heat treatment of a raw material mixture containing a group 2 element source, an Eu source, a Si source, an Al source, and a metal fluoride in a closed container made of tungsten at a temperature of 1800° C. or higher and 2100° C. or lower to obtain a heat-treated product.

A fifth embodiment provides a nitride phosphor having a composition containing Eu, Si, Al, N and a group 2 element including at least one selected from the group consisting of Mg, Ca, Sr, and Ba, wherein in the composition, a ratio of a total molar content of the group 2 element and Eu to a molar content of Al is 0.8 or more and 1.1 or less, a molar ratio of Eu is 0.002 or more and 0.08 or less, a molar ratio of Si is 0.8 or more and 1.2 or less, and a total molar ratio of Si and Al is 1.8 or more and 2.2 or less. The nitride phosphor has a first peak in a range of 17° 2θ or more and 19° 2θ or less and a second peak in a range where 2θ is 34° 2θ or more and 35.5° 2θ or less in a powder X-ray diffraction pattern measured by using a CuKα ray; an intensity ratio of the second peak to the first peak is 1 or more and 6 or less; and a half-value width of the second peak is 0.09° 2θ or more and less than 0.1° 2θ.

DETAILED DESCRIPTION

Figure 1:
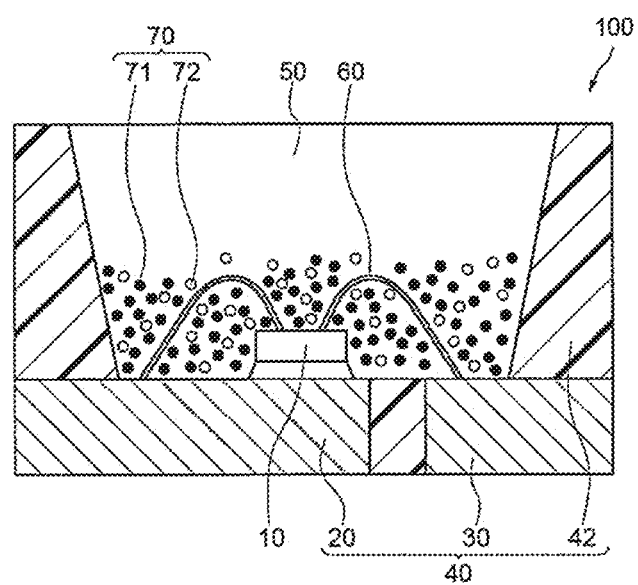
FIG. 1 is an exemplary schematic cross-sectional view showing an exemplary light emitting device.

The term "step" as used herein comprises not only an independent step but also a step not clearly distinguishable from another step as long as the intended purpose of the step is achieved. If multiple substances correspond to a component in a composition, the content of the component in the composition means the total amount of the multiple substances present in the composition unless otherwise specified. An upper limit and a lower limit of a range of numerical values described herein can arbitrarily be selected and combined from the numerical values. Embodiments of the present invention will hereinafter be described with reference to the drawings. However, the embodiments described below exemplify a nitride phosphor and a method for manufacturing the same for embodying the technical idea of the present invention, and the present invention is not limited to the nitride phosphor and the method for manufacturing the same described below. A relationship between a color name and a chromaticity coordinate, a relationship between a wavelength range of light and a color name of monochromatic light, etc. comply with JIS Z8110. If multiple substances correspond to a component in a composition, the content of the component in the composition means the total amount of the multiple substances present in the composition unless otherwise specified Nitride Phosphor A nitride phosphor has a composition containing a group 2 element including at least one selected from the group consisting of Mg, Ca, Sr, and Ba, as well as Eu, Si, Al, and N. In the composition of the nitride phosphor, a ratio of the total molar content of the group 2 element and Eu to a molar content of Al may be 0.8 or more and 1.1 or less; a ratio of a molar content of Eu may be 0.002 or more and 0.08 or less; a ratio of a molar content of Si may be 0.8 or more and 1.2 or less; and a ratio of a total molar content of Si and Al may be 1.8 or more and 2.2 or less. In the nitride phosphor, when a value is obtained by dividing a maximum value of peak intensity in a range of 34° 2θ or more and 35.5° 2θ or less by a maximum value of peak intensity in a range of 17° 2θ or more and 19° 2θ or less in a powder X-ray diffraction pattern measured by using a CuKα ray, the value may be 3.0 or more and 5.5 or less.

The nitride phosphor having the composition may have a first peak in a range of 17° 2θ or more and 19° 2θ or less and a second peak in a range of 34° 2θ or more and 35.5° 2θ or less in a powder X-ray diffraction pattern measured by using a CuKα ray. In the nitride phosphor, an intensity ratio of the second peak to the first peak may be 1 or more and 6 or less, and a half-value width of the second peak may be 0.09° 2θ or more and less than 0.1° 2θ.

The nitride phosphor having a specific composition and exhibiting a specific powder X-ray diffraction pattern may exhibit higher emission intensity. This is probably because performing a heat treatment in a specific closed container in a manufacturing method described later suppresses scattering of the raw material from the closed container used for the heat treatment and suppresses a reaction of the closed container used for the heat treatment and the raw material so that the nitride phosphor is uniformly synthesized.

The nitride phosphor has a composition containing a group 2 element including at least one selected from the group consisting of Mg, Ca, Sr, and Ba. The group 2 element contained in the composition of the nitride phosphor may contain at least one of Ca and Sr, and may contain at least Ca. A ratio of the total molar content of Ca and Sr to the total molar content of the group 2 element contained in the composition of the nitride phosphor may be, for example, 0.8 or more, preferably 0.9 or more, and substantially only Ca and Sr may be contained. As used herein, the term "substantially" means that the inevitably mixed group 2 element other than Ca and Sr are not excluded. The ratio of the molar content of the group 2 element other than Ca and Sr to the total molar content of Ca and Sr may be, for example, 0.1 or less, preferably 0.08 or less.

In the composition of the nitride phosphor, a ratio of the total molar content of the group 2 element and Eu to a molar content of Al is preferably 0.94 or more and 1.1 or less, or 0.95 or more and 1.05 or less. In the composition of the nitride phosphor, a ratio of the molar content of Eu to the molar content of Al may be preferably 0.002 or more and 0.08 or less, or 0.004 or more and 0.07 or less. In the composition of the nitride phosphor, a ratio of a molar content of Si to a molar content of Al may be preferably 0.8 or more and 1.2 or less, or 0.9 or more and 1.1 or less. In the composition of the nitride phosphor, a ratio of the total molar content of Si and Al to a molar content of Al is preferably 1.8 or more and 2.2 or less, or 1.9 or more and 2.1 or less. The composition of the nitride phosphor may be obtained by fluorescent X-ray (XRF) analysis.

The nitride phosphor may have, for example, a composition represented by Formula (I).

$$M^a{}_s Sr_t Eu_u Si_v Al_w N_x \qquad (I)$$

In Formula (I), $M^a$ is a group 2 element including at least one selected from the group consisting of Mg, Ca, and Ba, may contain at least one of Ca and Sr, and may preferably contain at least Ca. Additionally, s, t, u, v, w, and x may satisfy $0<s<1$, $0 \le t<1$, $0.002 \le u \le 0.08$, $0.8 \le s+t+u \le 1.1$, $0.8 \le v \le 1.2$, $0.8 \le w \le 1.2$, $1.8 \le v+w \le 2.2$, $2.5 \le x \le 3.2$. Furthermore, s, t, and u may satisfy $0.94 \le s+t+u \le 1.10$.

In the powder X-ray diffraction (XRD) pattern measured by using a CuKα ray (wavelength: 1.54184 Å), the nitride phosphor may have the first peak in the range of 17° 2θ or more and 19° 2θ or less, preferably 17.5° 2θ or more and 18.5° 2θ or less, and the second peak in the range of 34° 2θ or more and 35.5° 2θ or less, preferably 34.5° 2θ or more and 35.0° 2θ or less. The first peak may be a peak having a Miller index of (200), for example, and the second peak may be a peak having a Miller index of (002), for example. Assuming that the maximum value of the peak intensity of the first peak is $I^1$ and the maximum value of peak intensity of the second peak is $I^2$, a peak intensity ratio $I^2/I^1$ may be, for example, 3 or more and 5.5 or less, preferably 3.05 or more and 5.4 or less, or 3.1 or more and 5.3 or less. In one form, the peak intensity ratio $I^2/I^1$ may be, for example, 1 or more and 6 or less, preferably 1.2 or more, 1.4 or more, or 1.6 or more, and preferably 5.8 or less, 5.6 or less, or 5.5 or less.

When the composition of the nitride phosphor has a ratio of the molar content of Sr to the total molar content of the group 2 element and Eu of 0.85 or more, the peak intensity ratio $I^2/I^1$ may be, for example, 1 or more and 6 or less, preferably 1.5 or more and 5.8 or less, 2.5 or more and 5.6 or less, or 3 or more and 5.6 or less. When the composition of the nitride phosphor has a ratio of the molar content of Sr to the total molar content of the group 2 element and Eu of less than 0.85, the peak intensity ratio $I^2/I^1$ may be 1 or more and 5.5 or less, preferably 1.5 or more and 3.5 or less.

The half-value width of the second peak may be, for example, 0.09° or more and less than 0.1°. The half-value width of the second peak may be preferably 0.0930° or more, 0.0940° or more, or 0.0950° or more, and preferably 0.0995° or less, 0.0990° or less, or 0.0988° or less. When the half-value width of the second peak is not more than a predetermined value, higher emission intensity tends to be exhibited. This may be considered as follows, for example. When the half-value width of the second peak is not more than a predetermined value, this means that the composition is in a more uniform state in the crystal structure of the nitride phosphor, which probably improve the emission intensity. A half-value width of a peak in the powder X-ray diffraction pattern means a wavelength width (full width at half maximum; FWHM) of the powder X-ray diffraction pattern in which the emission intensity is 50% of the maximum emission intensity.

The powder X-ray diffraction pattern of the nitride phosphor measured by using a CuKα ray may have a maximum peak in the range of 34° 2θ or more and 37° 2θ or less, preferably 34.5° 2θ or more and 36.5° 2θ or less.

The volume average particle diameter of the nitride phosphor may be, for example, 10 μm or more, and may be preferably 13 μm or more, or 15 μm or more, from the viewpoint of luminous efficiency. The volume average particle diameter may be, for example, 30 μm or less, preferably 28 μm or less. When the volume average particle diameter of the nitride phosphor is larger, an absorption rate and luminous efficiency of excitation light tend to be higher. As described above, by applying the nitride phosphor having excellent optical characteristics to the light emitting device described later, the luminous efficiency of the light emitting device is further improved. Preferably, the nitride phosphor frequently contains nitride phosphor particles having the volume average particle diameter value described above. Therefore, preferably, the particle size distribution is distributed in a narrow range. By using the nitride phosphor having a small variation in particle size distribution, color unevenness is further suppressed and the light emitting device having a better color tone may be obtained.

The volume average particle diameter of the nitride phosphor is measured as a median diameter corresponding to a volume accumulation of 50% from the short diameter side in the particle size distribution by measuring the particle size distribution using a particle size distribution measuring device based on a pore electrical resistance method (electrical sensing zone method) based on the Coulter principle.

The nitride phosphor may have a peak emission wavelength in a range of 600 nm or more and 675 nm or less. The peak emission wavelength of the nitride phosphor may be preferably 605 nm or more, or 610 nm or more, and preferably 670 nm or less, or 665 nm or less.

Method for Manufacturing Nitride Phosphor

A method for manufacturing a nitride phosphor may comprise heat-treating a raw material mixture containing a group 2 element source, an Eu source, a Si source, and an Al source at a temperature of 1800° C. or higher and 2100° C. or lower in a closed container made of tungsten to obtain a heat-treated product.

The nitride phosphor manufactured by the method for manufacturing a nitride phosphor may have a composition containing a group 2 element including at least one selected from the group consisting of Mg, Ca, Sr, and Ba, as well as Eu, Si, Al, and N, and may have a composition in which a ratio of the total molar content of the group 2 element and Eu to the molar content of Al may be 0.8 or more and 1.1 or less, a ratio of the total molar content of Eu to the molar content of Al may be 0.002 or more and 0.08 or less, a ratio of the molar content of Si to the molar content of Al may be 0.8 or more and 1.2 or less, and the ratio of the total molar content of Si and Al to the molar content of Al may be 1.8 or more and 2.2 or less. The manufactured nitride phosphor may be the nitride phosphor described above.

By heat-treating the raw material mixture in a closed container made of tungsten at a predetermined temperature, the nitride phosphor capable of exhibiting higher emission intensity may efficiently be manufactured.

The raw material mixture used in the method for manufacturing a nitride phosphor may contain the group 2 element source containing at least one selected from the group consisting of Mg, Ca, Sr, and Ba, an Eu source, a Si source, and an Al source.

The group 2 element in the group 2 element source contained in the raw material mixture is at least one selected from the group consisting of Mg, Ca, Sr, and Ba, may contain at least one of Ca and Sr, and may contain at least Ca.

Examples of the group 2 element source include a metal compound containing the group 2 element, a metal simple substance containing the group 2 element, and an alloy containing the group 2 element. Examples of the metal compound containing the group 2 element include hydrides, oxides, hydroxides, nitrides, oxynitrides, chlorides, amide compounds, imide compounds, etc. containing the group 2 element, and hydrides, nitrides, etc. are preferable. The group 2 element source may contain Li, Na, K, B, Al, etc.

The metal compound containing a group 2 element may be purchased and prepared, or a metal compound containing a desired group 2 element may be manufactured and prepared. For example, calcium nitride may be obtained by pulverizing calcium as a raw material in an inert gas atmosphere and heat-treating the obtained powder in a nitrogen atmosphere for nitriding. The heat treatment temperature is, for example, 600° C. or higher and 900° C. or lower, and the heat treatment time is, for example, 1 hour or more and 20 hours or less. The obtained calcium nitride may be subjected to a pulverizing treatment in an inert gas atmosphere, for example. Strontium nitride may be obtained in the same manner as calcium nitride; however, unlike the case of calcium nitride, an amount of nitrogen contained may be changed depending on a manufacturing condition.

The purity of the group 2 element source (e.g., a metal compound containing a group 2 element) is, for example, 95 wt % or more, preferably 99.5 wt % or more. By setting the purity to a predetermined value or more, an influence of impurities may be reduced, and the emission intensity of the nitride phosphor may further be improved.

Examples of the Eu source contained in the raw material mixture include a europium compound, a metal simple substance of europium, and a europium alloy. Examples of the europium compound include oxides, hydroxides, nitrides, oxynitrides, fluorides, chlorides, etc. containing europium. Specific examples of the europium compound include europium oxide ($Eu_2O_3$), europium nitride (EuN), europium fluoride ($EuF_3$), etc., and it is preferable to use at least one selected from the group consisting of these compounds. Since europium nitride (EuN) is composed only of the elements of the intended phosphor composition, mixing of impurities may more effectively be suppressed. Europium oxide ($Eu_2O_3$) and europium fluoride ($EuF_3$) may act as a flux and are preferably used. The europium compound may be used alone, or two or more europium compounds may be used in combination.

The europium compound may be purchased and prepared, or a desired europium compound may be manufactured and used. For example, europium nitride may be obtained by pulverizing europium as a raw material in an inert gas atmosphere and heat-treating the obtained powder in a nitrogen atmosphere or an ammonia atmosphere for nitriding. An average particle diameter of the pulverized europium is, for example, 0.1 µm or more and 10 µm or less. The heat treatment temperature is, for example, 600° C. or higher and 1200° C. or lower, and the heat treatment time is, for example, 1 hour or more and 20 hours or less. The obtained europium nitride may be subjected to a pulverizing treatment in an inert gas atmosphere, for example.

The raw material mixture may be a mixture in which at least a portion of the Eu source is replaced with a metal compound, a metal simple substance, an alloy, etc. of a rare earth element such as scandium (Sc), yttrium (Y), lanthanum (La), cerium (Ce), praseodymium (Pr), neodymium (Nd), samarium (Sm), gadolinium (Gd), terbium (Tb), dysprosium (Dy), holmium (Ho), erbium (Er), thulium (Tm), ytterbium (Yb), and lutetium (Lu). Examples of the metal compound include oxides, hydroxides, nitrides, oxynitrides, fluorides, chlorides, etc.

The purity of the Eu source (e.g., the europium compound) is, for example, 95 wt % or more, preferably 99.5 wt % or more. By setting the purity to a predetermined value or more, the adverse effect due to the presence of impurities may be reduced, and the emission intensity of the phosphor may further be improved.

Examples of the Si source contained in the raw material mixture include a silicon compound, a silicon simple substance, and a silicon alloy. Examples of the silicon compound include oxides, hydroxides, nitrides, oxynitrides, fluorides, chlorides, etc. containing silicon. Specific examples of the silicon compound include silicon oxide, silicon nitride, silicon oxynitride, silicate, etc., it is preferable to use at least one selected from the group consisting of these compounds, and silicon nitride is more preferable. Since silicon nitride is composed only of the elements of the intended phosphor composition, mixing of impurities may more effectively be suppressed. For example, as compared to a silicon compound containing oxygen or hydrogen, silicon nitride may reduce an influence of these elements, and does not require a nitriding reaction as compared to a metal simple substance. The silicon compound may be used alone, or two or more silicon compounds may be used in combination.

The silicon compound may be purchased and prepared, or a desired silicon compound may be manufactured and used. For example, silicon nitride may be obtained by pulverizing silicon as a raw material in an inert gas atmosphere and heat-treating the obtained powder in a nitrogen atmosphere for nitriding. The heat treatment temperature is, for example, 800° C. or higher and 2000° C. or lower, and the heat treatment time is, for example, 1 hour or more and 20 hours or less. The obtained silicon nitride may be pulverized in an inert gas atmosphere, for example.

The raw material mixture may be a mixture in which at least a portion of the Si source is replaced with a metal compound, a metal simple substance, an alloy, etc. of a group 4 or group 14 element such as germanium (Ge), tin (Sn), titanium (Ti), zirconium (Zr), and hafnium (Hf). Examples of the metal compound include oxides, hydroxides, nitrides, oxynitrides, fluorides, chlorides, etc.

The purity of the Si source (e.g., the silicon compound) is, for example, 95 wt % or more, preferably 99 wt % or more. By setting the purity to a predetermined value or more, the influence of impurities may be reduced, and the emission intensity of the phosphor may further be improved.

Examples of the Al source contained in the raw material mixture include an aluminum compound, an aluminum metal simple substance, and an aluminum alloy. Examples of the aluminum compound include oxides, hydroxides, nitrides, oxynitrides, fluorides, chlorides, etc. containing aluminum. Specific examples of the aluminum compound include aluminum nitride (AlN), aluminum oxide ($Al_2O_3$), aluminum hydroxide ($Al(OH)_3$), etc., it is preferable to use at least one selected from the group consisting of these compounds, and aluminum nitride is more preferable. Since aluminum nitride is composed only of the elements of the intended phosphor composition, mixing of impurities may more effectively be suppressed. For example, as compared to an aluminum compound containing oxygen or hydrogen, aluminum nitride may reduce an influence of these elements, and does not require a nitriding reaction as compared to a metal simple substance. The aluminum compound may be used alone, or two or more silicon compounds may be used in combination.

The aluminum compound may be purchased and prepared, or a desired aluminum compound may be manufactured and used. For example, aluminum nitride may be manufactured by a direct nitriding method of aluminum etc.

The raw material mixture may be a mixture in which at least a portion of the Al source is replaced with a metal compound, a metal simple substance, an alloy, etc. of a group 13 element such as gallium (Ga) and indium (In), a group 5 element such as vanadium (V), a group 6 element such as chromium (Cr), or a group 9 element such as cobalt (Co). Examples of the metal compound include oxides, hydroxides, nitrides, oxynitrides, fluorides, chlorides, etc.

The purity of the Al source (e.g., the aluminum compound) is, for example, 95 wt % or more, preferably 99 wt % or more. By setting the purity to a predetermined value or more, the influence of impurities may be reduced, and the emission intensity of the phosphor may further be improved.

The raw material mixture may further contain at least one type of metal fluoride. When the raw material mixture further contains at least one type of metal fluoride, the nitride phosphor capable of exhibiting higher emission intensity tends to be obtained.

The metal fluoride may contain at least one selected from the group preferably consisting of a metal fluoride containing a group 2 element, a metal fluoride containing a rare earth element, a metal fluoride containing a group 4 or group 14 element, and a metal fluoride containing a group 13 element.

The group 2 element in the metal fluoride may contain at least one selected from the group consisting of Mg, Ca, Sr, and Ba, preferably at least one of Sr and Ca, more preferably at least Ca. When the raw material mixture contains at least one type of metal fluoride containing a group 2 element, the metal fluoride containing a group 2 element may be a portion of the group 2 element source. Therefore, a portion of the group 2 element source may be replaced with the metal fluoride containing a group 2 element.

When a portion of the group 2 element source is replaced with the metal fluoride containing a group 2 element, a ratio of a molar amount of the metal fluoride containing a group 2 element to a molar amount of the group 2 element source may be, for example, 0.05 or more and less than 1, preferably 0.08 or more, or 0.1 or more, and preferably 0.8 or less, 0.6 or less, or 0.4 or less.

The rare earth element in the metal fluoride may contain at least one selected from the group consisting of Sc, Y, La, Ce, Pr, Nd, Sm, Eu, Gd, Tb, Dy, Ho, Er, Tm, Yb, and Lu, preferably Eu. When the raw material mixture contains the metal fluoride containing a rare earth element, the metal fluoride containing a rare earth element may be a portion of the Eu source. Therefore, a portion of the Eu source may be replaced with the metal fluoride containing a rare earth element.

When a portion of the Eu source is replaced with the metal fluoride containing a rare earth element, a ratio of the number of moles of the metal fluoride containing a rare earth element to a molar amount of the Eu source is, for example, 0.05 or more and less than 1, preferably 0.08 or more, or 0.1 or more, and preferably 0.8 or less, 0.6 or less, or 0.4 or less.

The group 4 or group 14 element in the metal fluoride may contain at least one selected from the group consisting of Ge, Sn, Ti, Zr, and Hf. When the raw material mixture contains the metal fluoride containing a group 4 or group 14 element, the metal fluoride containing a group 4 or group 14 element may be a portion of the Si source. Therefore, a portion of the Si source may be replaced with the metal fluoride containing a group 4 or group 14 element.

When a portion of the Si source is replaced with the metal fluoride containing a group 4 or 14 element, a ratio of the number of moles of the metal fluoride containing a group 4 or 14 element to a molar amount of the Si source may be, for example, 0.05 or more and less than 1, preferably 0.08 or more, or 0.1 or more, and preferably 0.8 or less, 0.6 or less, or 0.4 or less.

The group 13 element in the metal fluoride may contain at least one selected from the group consisting of Al, Ga, and In, preferably Al. When the raw material mixture contains the metal fluoride containing a group 13 element, the metal fluoride containing a group 13 element may be a portion of the Al source. Therefore, a portion of the Al source may be replaced with the metal fluoride containing a group 13 element.

When a portion of the Al source is replaced with the metal fluoride containing a group 13 element, a ratio of the number of moles of the metal fluoride containing a group 13 element to a molar amount of the Al source is, for example, 0.05 or more and less than 1, preferably 0.08 or more, or 0.1 or more, and preferably 0.8 or less, 0.6 or less, or 0.4 or less.

The content of the metal fluoride in the raw material mixture is an amount in which a molar content ratio of fluorine atoms to Al is, for example, 0.01 or more and 0.3 or less, and the molar content ratio is preferably 0.01 or more and less than 0.3, more preferably 0.015 or more and 0.2 or less, further preferably 0.02 or more and 0.15 or less, and further preferably 0.025 or more and 0.1 or less. By setting the molar content ratio to the lower limit value or more, an effect of a flux may sufficiently be obtained. If a certain amount of a flux is contained, the effect of the flux is saturated, and no greater effect may be expected even if the flux is contained in a larger amount, and therefore, by setting the content to the upper limit or less, the effect of the flux may be obtained without containing the flux more than necessary.

The purity of the metal fluoride is, for example, 95 wt % or more, preferably 99 wt % or more. By setting the purity to a predetermined value or more, the influence of impurities may be reduced, and the emission intensity of the phosphor may further be improved. The metal fluoride containing a group 2 element may further contain Li, Na, K, B, Al, etc. The metal fluoride may be purchased and prepared, or a desired metal fluoride may be manufactured and prepared.

When the raw material mixture contains the metal fluoride, the raw material mixture may further contain another flux such as a halide in addition to the metal fluoride. Examples of the halide include rare earths, chlorides such as alkali metals, and fluorides. When the raw material mixture contains the flux, the content thereof is, for example, 20 mass % or less, preferably 10 mass % or less, more preferably 1 mass % or less relative to the metal fluoride.

The raw material mixture may further contain a nitride phosphor separately prepared as needed. When the raw material mixture contains the nitride phosphor, the content thereof may be, for example, 1 mass % or more and 50 mass % or less in the total amount of the raw material mixture.

The raw material mixture may be prepared by mixing the group 2 element source, the Eu source, the Si source, and the Al source in a predetermined amount ratio. Regarding the mixing ratio of the components in the raw material mixture, for example, a ratio of the total molar content of the group 2 element and Eu to the molar content of Al may be 0.8 or more and 1.1 or less, preferably 0.9 or more and 1.05 or less. A ratio of the molar content of Eu to the molar content of Al may be 0.002 or more and 0.08 or less, preferably 0.004 or more and 0.075 or less. A ratio of the molar content of Si to the molar content of Al may be 0.8 or more and 1.2 or less, preferably 0.9 or more and 1.1 or less. A ratio of the total molar content of Si and Al to the molar content of Al may be 1.8 or more and 2.2 or less, preferably 1.9 or more and 2.1 or less.

The mixing ratio of the components in the raw material mixture may be selected so that, for example, s, t, u, v, w, and x in Formula (Ia) satisfy the following requirements specified in Formula (Ia).

$$M^a{}_s Sr_t Eu_u Si_v Al_w N_x \qquad (Ia)$$

In Formula (Ia), $M^a$ is a group 2 element comprising at least one selected from the group consisting of Mg, Ca, and Ba. For s, t, u, v, w, and x, $0<s<1$, $0\le t<1$, $0.002\le u\le 0.08$, $0.8\le s+t+u\le 1.1$, $0.8\le v\le 1.2$, $0.8\le w\le 1.2$, $1.8\le v+w\le 2.2$, and $2.5\le x\le 3.2$ may be satisfied. For s, t, and u, $0.94\le s+t+u\le 1.10$ may be satisfied.

The raw material mixture may be obtained by weighing components constituting the raw material mixture at a desired mixing ratio and then mixing the components by a mixing method using a ball mill etc., a mixing method using a mixer such as a Henschel mixer or a V-type blender, or a mixing method using a mortar and a pestle. The mixing may be performed by a dry mixing method or by a wet mixing method by adding a solvent etc.

By heat-treating the obtained raw material mixture in a closed container made of tungsten, a nitride phosphor capable of exhibiting higher emission intensity may efficiently be manufactured. The closed container for heat-treating the raw material mixture may be substantially made of tungsten. The term "substantially" as used herein means that inevitably mixed impurities are not excluded.

The closed container refers to a container capable of preventing solid foreign substances from being mixed in under normal handling, transportation, or storage conditions (e.g., Article 37 of the Japanese Pharmacopoeia). The closed container is made up of, for example, a container body having an opening portion and a lid sealing the opening portion of the container body and may prevent solids from entering and exiting under heat treatment conditions. The closed container only needs to suppress entry and exit of gas under the heat treatment conditions and may not completely prevent the gas from entering and exiting. The shape of the container body of the closed container may have, for example, a bottom portion and a wall portion surrounding the bottom portion, and an upper portion facing the bottom portion may form the opening portion. The shape of the container body may be, for example, cylindrical, polygonal columnar, square, etc. In the closed container made of tungsten, at least a portion in contact with the raw material mixture may substantially be made of tungsten, and preferably, the entire closed container may substantially be made of tungsten.

An amount of the raw material mixture contained in the closed container may be, for example, 60 vol % or more and 100 vol % or less, preferably 75 vol % or more and 99 vol % or less, based on the capacity of the closed container.

In the method for manufacturing a nitride phosphor, using a closed container made of tungsten may suppress scattering, and reaction with the firing container, of the group 2 element source (particularly Sr), the Eu source, etc. contained in the raw material mixture during the heat treatment. For example, when a value obtained by subtracting the number of moles of Sr (s2) contained in the obtained nitride phosphor from the number of moles of Sr (s1) contained in the raw material mixture is divided by the number of moles of Sr (s1) contained in the raw material mixture and multiplied by 100 to obtain a Sr scattering rate ((s1−s2)/s1×100; %), the Sr scattering rate may be 6.5% or less, preferably 6.3% or less, or 6.0% or less. When the Sr scattering rate is not more than a predetermined value, the emission intensity of the obtained nitride phosphor tends to be further improved.

The temperature of the heat treatment may be, for example, 1800° C. or higher and 2100° C. or lower, preferably 1850° C. or higher, or 1900° C. or higher. The temperature of the heat treatment may be preferably 2080° C. or lower, 2060° C. or lower, or 2000° C. or lower. By performing the heat treatment at a temperature equal to or higher than the lower limit, Eu easily enters a crystal, and a desired nitride phosphor is efficiently formed. When the heat treatment temperature is not more than the upper limit value, the decomposition of the formed nitride phosphor tends to be suppressed. The heat treatment of the raw material mixture may be performed by using a gas pressurized electric furnace, for example.

The atmosphere in the heat treatment of the raw material mixture is preferably an atmosphere containing nitrogen gas, and more preferably a substantially nitrogen gas atmosphere. By using the atmosphere containing nitrogen gas, silicon contained in the raw material may be nitrided. Additionally, this may suppress decomposition of raw materials and phosphors that are nitrides. When the atmosphere of the heat treatment of the raw material mixture contains nitrogen gas, the atmosphere may contain hydrogen, a rare gas such as argon, and other gases such as carbon dioxide, carbon monoxide, oxygen, and ammonia, in addition to the nitrogen gas. The nitrogen gas content in the atmosphere for heat treatment of the raw material mixture is, for example, 90 vol % or more, preferably 95 vol % or more. By setting the content of gas containing elements other than nitrogen to a predetermined value or less, a decrease in the emission intensity of the phosphor due to formation of impurities from these gas components is suppressed.

The pressure in the heat treatment of the raw material mixture may be, for example, from normal pressure to 200 MPa. From the viewpoint of suppressing the decomposition of the generated nitride phosphor, a pressure is preferably high and preferably 0.1 MPa or more and 200 MPa or less as a gauge pressure, and 0.6 MPa or more and 1.2 MPa or less is more preferable due to less restriction on industrial equipment.

The heat treatment of the raw material mixture may be performed at a single temperature or may be performed in multiple stages including two or more heat treatment temperatures. When the heat treatment is performed in multiple stages, for example, a first-stage heat treatment is performed at 1200° C. or higher and 1600° C. or lower, preferably 1300° C. or higher and 1500° C. or lower, and the temperature is then gradually increased to 1800° C. or higher and 2100° C. or lower, preferably 1850° C. or higher and 2050° C. or lower to perform a second-stage heat treatment. The multistage heat treatment may include, for example, performing a first heat treatment of the raw material mixture at a temperature of 1200° C. or higher and 1600° C. or lower, preferably 1300° C. or higher and 1500° C. or lower to obtain a first heat-treated product, and subsequently performing a second heat treatment of the first heat-treated product obtained by lowering the temperature, at a temperature of 1800° C. or higher and 2100° C. or lower, preferably 1850° C. or higher and 2050° C. or lower to obtain a second heat-treated product. Furthermore, the multistage heat treatment may include performing a cracking treatment, a pulverizing treatment, etc. of the first heat-treated product to obtain a pulverized product. The multi-stage heat treatment tends to provide a nitride phosphor capable of exhibiting higher emission intensity.

In the heat treatment of the raw material mixture, for example, the heat treatment is performed by raising the temperature from room temperature to a predetermined temperature. A temperature rising time is, for example, 1 hour or more and 48 hours or less, preferably 2 hours or more and 24 hours or less, more preferably 3 hours or more and 20 hours or less. When the temperature rising time is not less than the lower limit, the particle growth of the nitride phosphor tends to sufficiently proceed, and Eu tends to easily enter the crystal of the nitride phosphor.

The heat treatment of the raw material mixture may include a retention time at a predetermined temperature. The retention time is, for example, 0.5 hours or more and 48 hours or less, preferably 1 hour or more and 30 hours or less, and more preferably 2 hours or more and 20 hours or less. By setting the retention time to the lower limit value or more, uniform particle growth may further be promoted. By setting the retention time to the upper limit value or less, the decomposition of the phosphor may further be suppressed.

The temperature lowering time from a predetermined temperature to room temperature in the heat treatment of the raw material mixture is, for example, 0.1 hour or more and 20 hours or less, preferably 1 hour or more and 15 hours or less, and more preferably 3 hours or more and 12 hours or less. It should be noted that a retention time may be set at an appropriately selected temperature while the temperature is lowered from the predetermined temperature to room temperature. For example, this retention time is adjusted so that the emission intensity of the nitride phosphor is further improved. The retention time at a predetermined temperature during the temperature decrease is, for example, 0.1 hour or more and 20 hours or less, preferably 1 hour or more and 10 hours or less. The temperature during the retention time is, for example, 1000° C. or higher and lower than 1800° C., preferably 1200° C. or higher and 1700° C. or lower.

After the heat treatment of the raw material mixture, a sizing step may be included in which the heat-treated product containing the nitride phosphor obtained by the heat treatment is subjected to a combination of treatments such as cracking, crushing, and classification operation. A powder having a desired particle diameter may be obtained by the sizing step. Specifically, after the nitride phosphor is roughly pulverized and may then be pulverized to a predetermined particle size by using a typical pulverizer such as a ball mill, a jet mill, or a vibration mill. However, excessive pulverization may cause defects on the surfaces of the nitride phosphor particles, which may cause a decrease in luminance. Particles having different particle sizes generated by pulverization exist, classification may be performed to adjust the particle diameter.

A first aspect of the method for manufacturing a nitride phosphor may include performing a first heat treatment of the raw material mixture containing the group 2 element source, the Eu source, the Si source, and the Al source in the closed container made of tungsten at a temperature of 1200° C. or higher and 1600° C. or lower to obtain a first heat-treated product, and performing a second heat treatment of the first heat-treated product in the closed container made of tungsten at a temperature of 1800° C. or higher and 2100° C. or lower to obtain a second heat-treated product.

A second aspect of the method for manufacturing a nitride phosphor may include performing a heat treatment of the raw material mixture containing the group 2 element source, the Eu source, the Si source, the Al source, and the metal fluoride in the closed container made of tungsten at a temperature of 1800° C. or higher and 2100° C. or lower to obtain a heat-treated product.

A third aspect of the method for manufacturing a nitride phosphor may include performing a third heat treatment of the raw material mixture containing the group 2 element source, the Eu source, the Si source, the Al source, and the metal fluoride in the closed container made of tungsten at a temperature of 1200° C. or higher and 1600° C. or lower to obtain a third heat-treated product, and performing a fourth heat treatment of the third heat-treated product in the closed container made of tungsten at a temperature of 1800° C. or higher and 2100° C. or lower to obtain a fourth heat-treated product.

Light Emitting Device

An aspect of a light emitting device includes a fluorescent member containing the nitride phosphor described above and a light emitting element having a peak emission wavelength within a range of 365 nm or more and 500 nm or less. A light emitting device 100 according to this embodiment will be described in detail with reference to FIG. 1. The light emitting device 100 is an example of a surface mount light emitting device. The light emitting device 100 includes a light emitting element 10 of a gallium nitride-based compound semiconductor having a peak emission wavelength in a range of 380 nm or more and 470 nm or less, and a molded body 40 on which the light emitting element 10 is placed. The molded body 40 is formed by integrally molding a first lead 20, a second lead 30, and a resin portion 42. The molded body 40 forms a recess having a bottom surface and a side surface, and the light emitting element 10 is placed on a bottom surface of the recess. The light emitting element 10 has a pair of positive and negative electrodes, and the pair of positive and negative electrodes is electrically connected to the first lead 20 and the second lead 30 via wires 60. The light emitting element 10 is covered by a fluorescent member 50. For example, the fluorescent member 50 contains a first phosphor 71 and a second phosphor 72 as a phosphor 70 converting a wavelength of light from the light emitting element 10, and a resin.

The peak emission wavelength of the light emitting element 10 is preferably in a range of 380 nm or more and 470 nm or less, and preferably in a range of 400 nm or more and 460 nm or less. By using the light emitting element 10 having a peak emission wavelength within this range as an excitation light source, the light emitting device 100 emitting a mixed color light of a light from the light emitting element 10 and a fluorescence from the phosphor 70 may be formed. Furthermore, since a portion of the light radiated from the light emitting element 10 may effectively be used as a portion of the light radiated from the light emitting device to the outside, the light emitting device 100 having high luminous efficiency may be obtained.

A half-value width of the emission spectrum of the light emitting element 10 may be 30 nm or less, for example. For example, a semiconductor light emitting element using a nitride-based semiconductor is preferably used as the light emitting element 10. Using a semiconductor light emitting element as an excitation light source may provide a stable light emitting device having high efficiency, high linearity of output with respect to input, and resistance to mechanical impact.

The fluorescent member 50 includes at least the first phosphor 71 and may contain other phosphors, resins, etc., as needed. The details of the nitride phosphor contained in the first phosphor 71 are as described above, and a preferable form is also the same.

The fluorescent member 50 may include a second phosphor 72 in addition to the first phosphor 71. Since the fluorescent member 50 includes the second phosphor 72, the light emitting device 100 emitting a mixed color light of the light emitting element 10 as well as the first phosphor 71 and the second phosphor 72 may be formed.

The second phosphor 72 may be a phosphor having a composition represented by any of Formulae (IIa) to (IIi) below; preferably, at least one phosphor having a composition represented by a formula selected from the group consisting of these formulae is included; and more preferably, at least one phosphor having a composition represented by Formula (IIa), (IIb), (IIc), (IId), (IIe), (IIg), (IIh), or (IIi) is included. This is because a light emitting device having high color rendering properties and high luminous efficiency may be obtained by including these second phosphors. The light emitting device may include only one type, or a combination of two or more types, of the second phosphor 72.

$(Y,Gd,Tb,Lu)_3(Al,Ga)_5O_{12}:Ce$ (IIa)

$(Ca,Sr,Ba)_2SiO_4:Eu$ (IIb)

$Si_{6-p}Al_pO_pN_{8-p}:Eu(0<p\leq4.2)$ (Ic)

$(Ca,Sr)_8MgSi_4O_{16}(F,Cl,Br)_2:Eu$ (IId)

$(La,Y,Gd,Lu)_3Si_6N_{11}:Ce$ (IIe)

$(Ca,Sr,Ba)Ga_2S_4:Eu$ (IIf)

(Ca,Sr,Ba)$_2$Si$_5$N$_8$:Eu (IIg)

(Ca,Sr,Ba)LiAl$_3$N$_4$:Eu (IIh)

(Ca,Sr,Ba)$_{10}$(PO$_4$)$_6$(F,Cl,Br)$_2$:Eu (IIi)

In the formula representing the composition of the phosphor, elements constituting a parent crystal and a molar ratio thereof are represented before a colon (:), and an activating element is represented after the colon (:). In the formula representing the composition of the phosphor, multiple elements separated by commas (,) represents that at least one element among these multiple elements is contained in the composition and that two or more of the elements may be combined and contained.

The second phosphor 72 may be a phosphor having a composition represented by any of Formulae (IIj) and (IIk) below, and preferably, at least one phosphor having a composition represented by a formula selected from the group consisting of these formulae is included. This is more preferable because a light emitting device having high color rendering properties and high luminous efficiency may be obtained by including these second phosphors.

$A^1_c[M^1_{1-b}Mn_bF_d]$ (IIj)

$A^2_f[M^2_{1-e}Mn_eF_g]$ (IIk)

In Formula (IIj), $A^1$ comprises at least one selected from the group consisting of Li, Na, K, Rb, and Cs. $M^1$ comprises at least one of Si and Ge and may further comprise at least one element selected from the group consisting of a group 4 element and a group 14 element. In the formula, b satisfies 0<b<0.2, c is an absolute value of charge of the $[M^2_{1-b}Mn_bF_d]$ ion, and d satisfies 5<d<7.

In Formula (IIk), $A^2$ comprises at least one selected from the group consisting of Li, Na, K, Rb, and Cs. $M^2$ comprises at least Si and Al and may further comprise at least one element selected from the group consisting of a group 4 element, a group 13 element, and a group 14 element. In the formula, e satisfies 0<e<0.2, f is an absolute value of charge of the $[M^2_{1-e}Mn_eF_g]$ ion, and g satisfies 5<g<7.

The average particle diameter of the second phosphor 72 is, for example, 2 μm or more and 35 μm or less, preferably 5 μm or more and 30 μm or less. When the average particle diameter of the second phosphor 72 is not less than the lower limit value, an absorption rate of light from an excitation light source is increased, and light emission having a desired chromaticity may be obtained with higher emission intensity. When the average particle diameter of the second phosphor 72 is not more than the upper limit value, workability may be improved in a manufacturing step of the light emitting device 100 when the second phosphor 72 is contained in the fluorescent member 50 of the light emitting device 100.

The fluorescent member 50 may contain at least one type of resin in addition to the first phosphor 71. Examples of the resin include epoxy resin and silicone resin.

The fluorescent member 50 may contain other components in addition to the first phosphor 71 as needed. Examples of other components include fillers such as silica, barium titanate, titanium oxide, and aluminum oxide, light stabilizers, and colorants. When the fluorescent member 50 contains other components, for example, when the fluorescent member 50 contains a filler as the other component, the content thereof may be 0.01 to 20 parts by weight based on 100 parts by weight of the resin.

Another configuration example of the light emitting device will be described with reference to the drawings.

Figure 7:
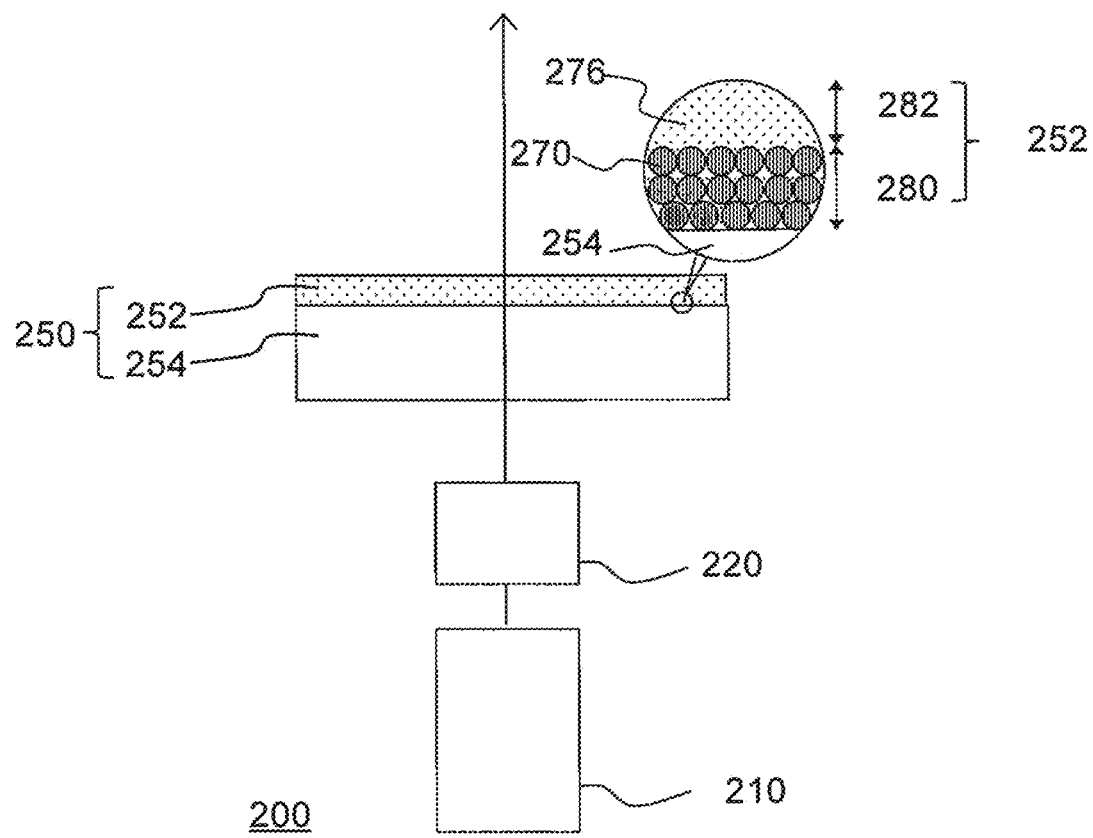
FIG. 7 is an exemplary schematic configuration diagram showing an exemplary configuration of a light emitting device.

FIG. 7 is a schematic configuration diagram showing an example of the configuration of the light emitting device. A light emitting device 200 includes a light emitting element 210, an incident optical system 220, and a wavelength conversion member 250. The wavelength conversion member 250 includes a support 254 and a wavelength conversion layer 252 arranged on the support 254 and including a phosphor layer 280 containing a phosphor 270 and a light transmission layer 282 containing a resin 276. The light emitted from the light emitting element 210 passes through the incident optical system 220, enters from the support 254 side of the wavelength conversion member 250, and passes through the phosphor layer 280 including the phosphor 270 so that at least a portion of incident light is wavelength-converted by the phosphor 270. Alternatively, both the wavelength-converted light and the rest of the incident light not wavelength-converted are emitted from the wavelength conversion member 250. In this case, the light emitted by the light emitting device 200 is a mixed color light of the light from the light emitting element 210 and the wavelength-converted light.

Figure 8:
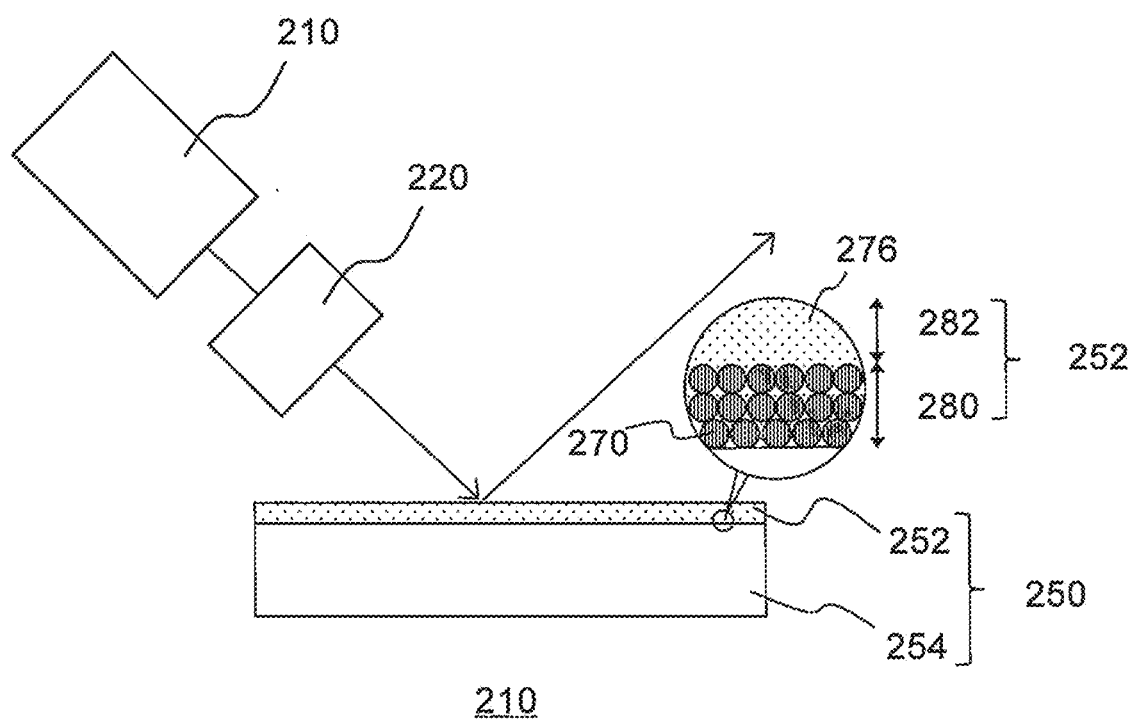
FIG. 8 is an exemplary schematic configuration diagram showing an exemplary configuration of a light emitting device.

FIG. 8 is a schematic configuration diagram showing an example of the configuration of the light emitting device. The light emitting device 210 includes the light emitting element 210, the incident optical system 220, and the wavelength conversion member 250. The wavelength conversion member 250 includes the support 254 and the wavelength conversion layer 252 arranged on the support 254 and having the phosphor layer 280 containing the phosphor 270 and the light transmission layer 282 containing the resin 276 laminated in this order. The light emitted from the light emitting element 210 passes through the incident optical system 220, enters from the wavelength conversion layer 252 side of the wavelength conversion member 250, and passes through the wavelength conversion layer 252, and the reflected light is emitted from the wavelength conversion layer 252. At least a portion of the light passing through the wavelength conversion layer 252 is wavelength-converted by the phosphor 270. Alternatively, both the wavelength-converted light and the rest of the incident light not wavelength-converted are emitted from the wavelength conversion member 250. In this case, the light emitted by the light emitting device 210 is a mixed color light of the light from the light emitting element 210 and the wavelength-converted light.

Wavelength Conversion Member

The wavelength conversion member includes a support and a phosphor layer arranged on the support and containing a phosphor. The wavelength conversion member may be combined with a light emitting element to form a light emitting device. Containing the nitride phosphor described above as the phosphor makes it possible to exhibit emission characteristics with excellent linearity in which the emission intensity of the output light increases in proportion to the output of the light emitting element, so that the emission characteristics are excellent.

Figure 9A:
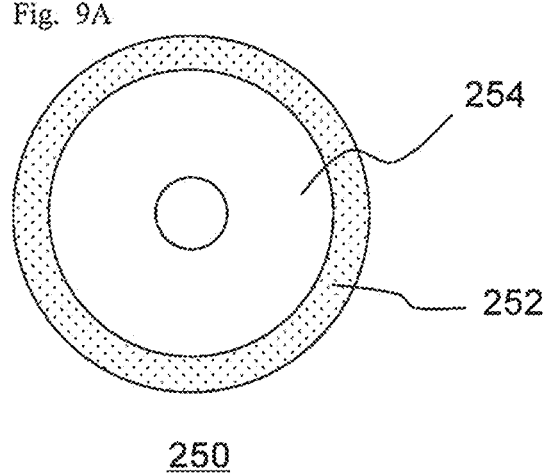
FIG. 9A is an exemplary schematic plan view of an exemplary wavelength conversion member as viewed from a principal surface.
Figure 9B:
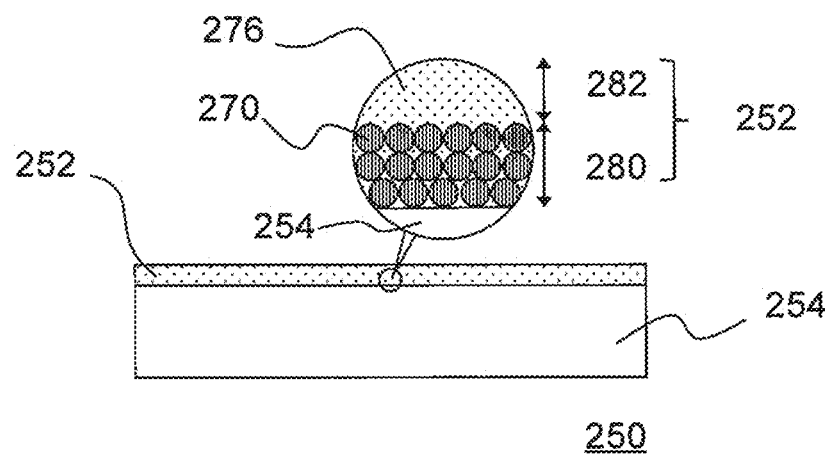
FIG. 9B is an exemplary schematic side view of the exemplary wavelength conversion member as viewed from a side surface and a partially enlarged view thereof.

An example of the wavelength conversion member is schematically shown in FIGS. 9A and 9B. FIG. 9A is a schematic plan view of the wavelength conversion member 250 as viewed from a principal surface. FIG. 9B is a schematic side view and a partially enlarged view of the wavelength conversion member 250 as viewed from a side surface. As shown in FIG. 9A, the wavelength conversion layer 252 is arranged along the circumference of the disk-shaped support 254. As shown in FIG. 1B, the fluorescence layer 280 containing the phosphor 270 and the light transmission layer 282 containing the resin 276 are laminated in this order on one of the principal surfaces of the support 254 so that the wavelength conversion layer 252 is arranged.

The output of the light emitting element may be, for example, 0.5 W/mm$^2$ or more, preferably 5 W/mm$^2$ or more, or 10 W/mm$^2$ or more, as a power density of light incident on the wavelength conversion member. An upper limit of output of the light emitting element may be, for example, 1000 W/mm$^2$ or less, preferably 500 W/mm$^2$ or less, or 150 W/mm$^2$ or less. When the output of the light emitting element is within the range, the wavelength conversion member is more excellent in linearity corresponding to the output of the light emitting element.

Light Source Device for Projector

A light source device for a projector is configured to include the light emitting device. by including the light emitting device having excellent light emitting characteristics at high output, a high-output projector may be configured.

The light emitting device including the nitride phosphor of the present disclosure may be used not only as a light source device for a projector, but also as a light emitting device included in a light source of, for example, general lighting devices such as ceiling lights, special lighting devices such as spotlights, stadium lightings, and studio lightings, vehicle lighting devices such as head lamps, projection devices such as head-up displays, lights for endoscopes, digital cameras, image pickup devices of mobile phones and smartphones, monitors for personal computers (PCs), notebook personal computers, televisions, mobile information terminals (PDXs), liquid crystal display devices of smartphones, tablet PCs, and mobile phones.

The wavelength conversion member constituting the light emitting device includes at least one of the nitride phosphors as the phosphor. In addition to the nitride phosphor described above, the wavelength conversion member may further contain another phosphor having a configuration different from the nitride phosphor described above. Specific examples of the other phosphor include $Y_3Al_5O_{12}$:Ce, (La, Y)$_3$Si$_6$Nu:Ce, (Ca, Sr) AlSiN$_3$:Ce, etc.

EXAMPLES

The present invention will hereinafter specifically be described with reference to Examples; however, the present invention is not limited to these Examples.

Example 1

$Ca_3N_2$, SrNx (x=2/3), AlN, $Si_3N_4$, and EuN were used as raw materials and were weighed and mixed in a glove box having an inert atmosphere at a molar ratio as a charging amount ratio of Sr:Ca:Eu:Al:Si=0.964:0.030:0.006:1:1 to obtain a raw material mixture. The raw material mixture was filled in a tungsten crucible, covered with a lid, and sealed. A first-stage heat treatment was performed in a nitrogen gas atmosphere under the conditions of a gauge pressure of 0.92 MPa, a heat treatment temperature of 1400° C., and a retention time of 3 hours to obtain a precursor. The precursor was pulverized and thereby homogenized in a glove box in an inert atmosphere, and is filled in a tungsten crucible, covered with a lid, and sealed. A second-stage heat treatment was performed in a nitrogen gas atmosphere with a gauge pressure of 0.92 MPa, a heat treatment temperature of 1950° C., and a retention time of 15 hours. Subsequently, pulverization, dispersion, and classification treatments were performed to obtain a nitride phosphor of Example 1.

Comparative Example 1

A nitride phosphor of Comparative Example 1 was obtained as in Example 1 except that the Ca source in the raw material was changed to $CaF_2$, that a boron nitride crucible was used instead of the tungsten crucible, and that the heat treatment was performed only once under the conditions of the heat treatment temperature of 2050° C. and the retention time of 0.5 hours.

Comparative Example 2

A nitride phosphor of Comparative Example 2 was obtained as in Example 1 except that the heat treatment was performed only once under the conditions of the heat treatment temperature of 1950° C. and the retention time of 15 hours.

Example 2

A nitride phosphor of Example 2 was obtained as in Example 1 except that the molar ratio of the raw materials as the charging amount ratio was Sr:Ca:Eu:Al:Si=0.937:0.049:0.014:1:1.

Comparative Example 3

The nitride phosphor of Comparative Example 3 was obtained as in Example 2 except that the Ca source in the raw material was changed to a mixture having a Ca molar ratio of $Ca_3N_2$:$CaF_2$=0.019:0.03, that a boron nitride crucible was used instead of the tungsten crucible, and that the heat treatment was performed only once under the conditions of the heat treatment temperature of 2050° C. and the retention time of 0.5 hours.

Comparative Example 4

The nitride phosphor of Comparative Example 4 was obtained as in Example 2 except that the heat treatment was performed only once under the conditions of the heat treatment temperature of 1950° C. and the retention time of 15 hours.

Example 3

The nitride phosphor of Example 3 was obtained as in Example 2 except that the Ca source in the raw material was changed to a mixture having a Ca molar ratio of $Ca_3N_2$:$CaF_2$=0.034:0.015 and that the heat treatment was performed only once under the conditions of the heat treatment temperature of 1950° C. and the retention time of 15 hours.

Example 4

The nitride phosphor of Example 4 was obtained as in Example 1 except that the molar ratio of the raw materials as the charging amount ratio was Sr:Ca:Eu:Al:Si=0.926:0.049:0.025:1:1, that the Ca source in the raw material was changed to a mixture having a molar ratio of $Ca_3N_2$:$CaF_2$=0.034:0.015, and that the heat treatment was performed only once under the conditions of the heat treatment temperature of 1950° C. and the retention time of 15 hours.

Example 5

The nitride phosphor of Example 4 was obtained as in Example 1 except that the molar ratio of the raw materials as the charging amount ratio was Sr:Ca:Eu:Al:Si=0.882:

0.098:0.02:1:1, that the Ca source in the raw material was changed to a mixture having a molar ratio of $Ca_3N_2$:$CaF_2$=0.083:0.015, and that the heat treatment was performed only once under the conditions of the heat treatment temperature of 1950° C. and the retention time of 15 hours.

Comparative Example 5

The nitride phosphor of Comparative Example 5 was obtained as in Example 5 except that the Ca source in the raw material was changed to a mixture having a Ca molar ratio of $Ca_3N_2$:$CaF_2$=0.069:0.029, that a boron nitride crucible was used instead of the tungsten crucible, and that the heat treatment was performed only once under the conditions of the heat treatment temperature of 2050° C. and the retention time of 0.5 hours.

Example 6

The nitride phosphor of Example 6 was obtained as in Example 1 except that the molar ratio of the raw materials as the charging amount ratio was Sr:Ca:Eu:Al:Si=0.965:0.03:0.005:1:1 and that the Ca source in the raw material was changed to a mixture having a molar ratio of $Ca_3N_2$:$CaF_2$=0.009:0.021.

Example 7

The nitride phosphor of Example 7 was obtained as in Example 1 except that the molar ratio of the raw materials as the charging amount ratio was Sr:Ca:Eu:Al:Si=0.698:0.299:0.003:1:1 and that the Ca source in the raw material was changed to a mixture having a molar ratio of $Ca_3N_2$:$CaF_2$=0.284:0.015, and that the heat treatment was performed only once under the conditions of the heat treatment temperature of 1950° C. and the retention time of 15 hours.

Comparative Example 6

The nitride phosphor of Comparative Example 6 was obtained as in Example 6 except that the molar ratio of the raw materials as the charging amount ratio was Sr:Ca:Eu:Al:Si=0.697:0.299:0.004:1:1, that a boron nitride crucible was used instead of the tungsten crucible, and that the heat treatment was performed only once under the conditions of the heat treatment temperature of 2050° C. and the retention time of 0.5 hours.

Example 8

The nitride phosphor of Example 4 was obtained as in Example 1 except that the molar ratio of the raw materials as the charging amount ratio was Sr:Ca:Eu:Al:Si=0.598:0.399:0.015:1:1, that the Ca source in the raw material was changed to a mixture having a molar ratio of $Ca_3N_2$:$CaF_2$=0.384:0.015, and that the heat treatment was performed only once under the conditions of the heat treatment temperature of 1950° C. and the retention time of 15 hours.

Evaluation

Composition Analysis

The nitride phosphors obtained as described above were subjected to composition analysis by an ICP-AES device (manufactured by Perkin Elmer) and an ion chromatography system (manufactured by Thermo Fisher Scientific/formerly Nippon Dionex). A molar content ratio of each element was calculated when Al contained in the composition was 1 mol. The results are shown in Table 1.

Sr Scattering Rate

A value obtained by subtracting the molar amount of Sr (s2) in the composition analysis value from the molar amount of Sr (s1) in the charging molar ratio was divided by the molar amount of Sr (s1) in the charging molar ratio and multiplied by 100 to obtain a Sr scattering rate ((s1−s2)/s1× 100; %). The results are shown in Table 1.

TABLE 1

| | Charging amount ratio | | | | | Ca source | Composition analysis (mole ratio) | | | | | Sr + Ca + Eu | Sr scattering rate (%) |
| --- | --- | --- | --- | --- | --- | --- | --- | --- | --- | --- | --- | --- | --- |
| | Sr | Ca | Eu | Si | Al | | Sr | Ca | Eu | Si | Al | | |
| Example 1 | 0.964 | 0.030 | 0.006 | 1 | 1 | $Ca_3N_2$ | 0.922 | 0.031 | 0.006 | 1.00 | 1 | 0.959 | 4.4 |
| Example 6 | 0.965 | 0.030 | 0.005 | 1 | 1 | $Ca_3N_2$ + $CaF_2$ | 0.912 | 0.031 | 0.005 | 1.01 | 1 | 0.948 | 5.6 |
| Comparative Example 1 | 0.964 | 0.030 | 0.006 | 1 | 1 | $CaF_2$ | 0.891 | 0.034 | 0.007 | 1.02 | 1 | 0.932 | 7.5 |
| Comparative Example 2 | 0.964 | 0.030 | 0.006 | 1 | 1 | $Ca_3N_2$ | 0.918 | 0.032 | 0.006 | 1.01 | 1 | 0.955 | 4.8 |
| Example 2 | 0.937 | 0.049 | 0.014 | 1 | 1 | $Ca_3N_2$ | 0.887 | 0.049 | 0.014 | 1.00 | 1 | 0.950 | 5.3 |
| Comparative Example 3 | 0.937 | 0.049 | 0.014 | 1 | 1 | $Ca_3N_2$ + $CaF_2$ | 0.871 | 0.053 | 0.014 | 1.02 | 1 | 0.938 | 7.1 |
| Comparative Example 4 | 0.937 | 0.049 | 0.014 | 1 | 1 | $Ca_3N_2$ | 0.885 | 0.049 | 0.014 | 0.98 | 1 | 0.948 | 5.6 |
| Example 3 | 0.937 | 0.049 | 0.014 | 1 | 1 | $Ca_3N_2$ + $CaF_2$ | 0.881 | 0.057 | 0.014 | 1.00 | 1 | 0.953 | 5.9 |
| Example 4 | 0.926 | 0.049 | 0.025 | 1 | 1 | $Ca_3N_2$ + $CaF_2$ | 0.874 | 0.050 | 0.024 | 1.00 | 1 | 0.948 | 5.6 |
| Example 5 | 0.882 | 0.098 | 0.020 | 1 | 1 | $Ca_3N_2$ + $CaF_2$ | 0.844 | 0.099 | 0.020 | 1.02 | 1 | 0.963 | 4.3 |
| Comparative Example 5 | 0.882 | 0.098 | 0.020 | 1 | 1 | $Ca_3N_2$ + $CaF_2$ | 0.816 | 0.102 | 0.021 | 1.02 | 1 | 0.939 | 7.5 |
| Example 7 | 0.698 | 0.299 | 0.003 | 1 | 1 | $Ca_3N_2$ + $CaF_2$ | 0.666 | 0.298 | 0.003 | 1.00 | 1 | 0.968 | 4.5 |
| Comparative Example 6 | 0.697 | 0.299 | 0.004 | 1 | 1 | $Ca_3N_2$ + $CaF_2$ | 0.605 | 0.323 | 0.004 | 1.08 | 1 | 0.932 | 13.2 |
| Example 8 | 0.598 | 0.399 | 0.003 | 1 | 1 | $Ca_3N_2$ + $CaF_2$ | 0.571 | 0.397 | 0.003 | 1.01 | 1 | 0.972 | 4.4 |

X-Ray Diffraction Pattern Measurement

Figure 4:
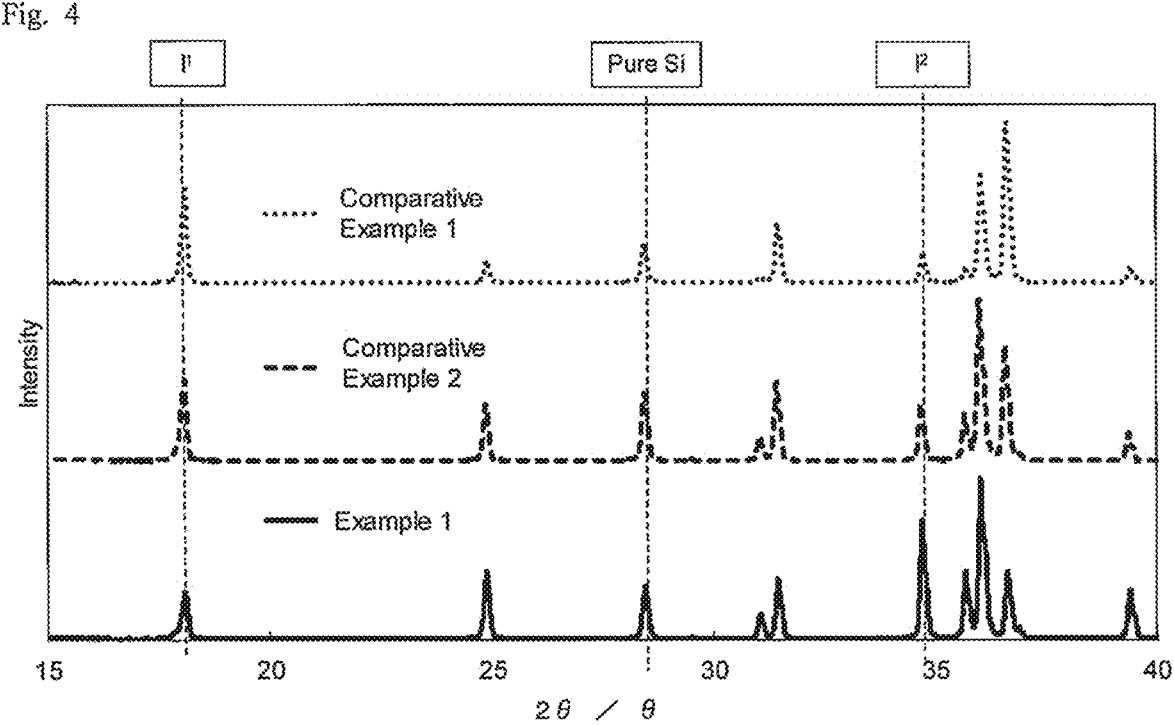
FIG. 4 shows exemplary X-ray diffraction (XRD) patterns of nitride phosphors according to Example 1, Comparative Example 1, and Comparative Example 2.
Figure 5:
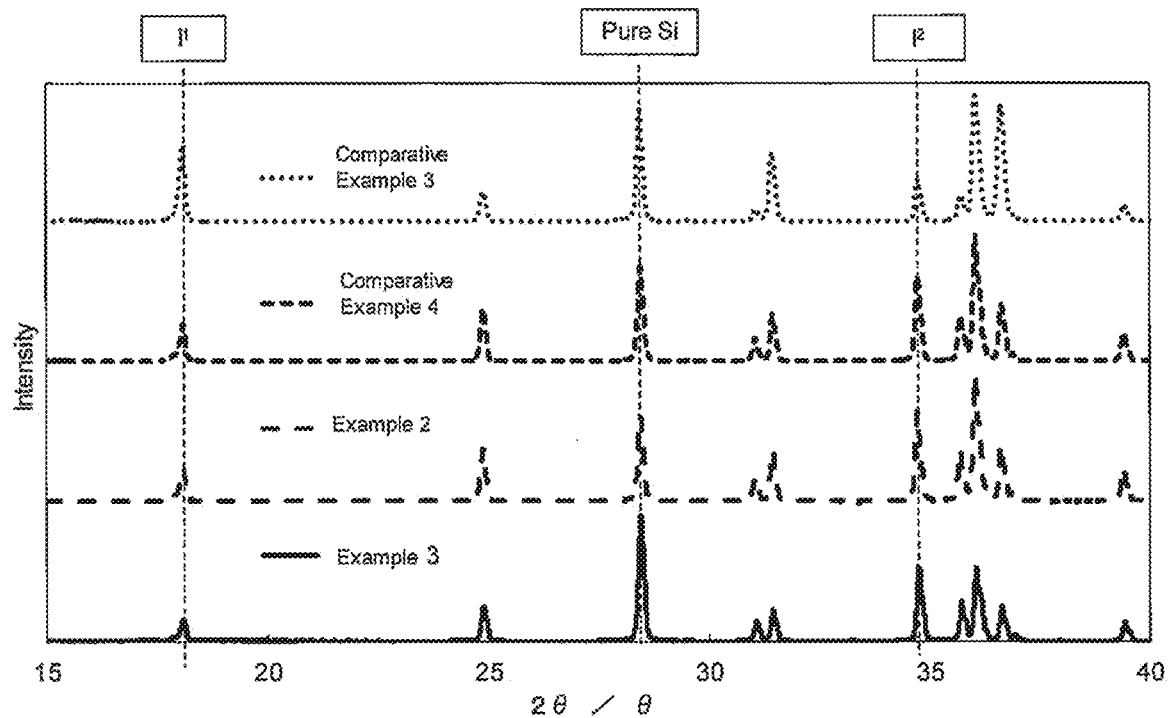
FIG. 5 shows exemplary XRD patterns of nitride phosphors according to Example 2, Example 3, Comparative Example 3, and Comparative Example 4.
Figure 6:
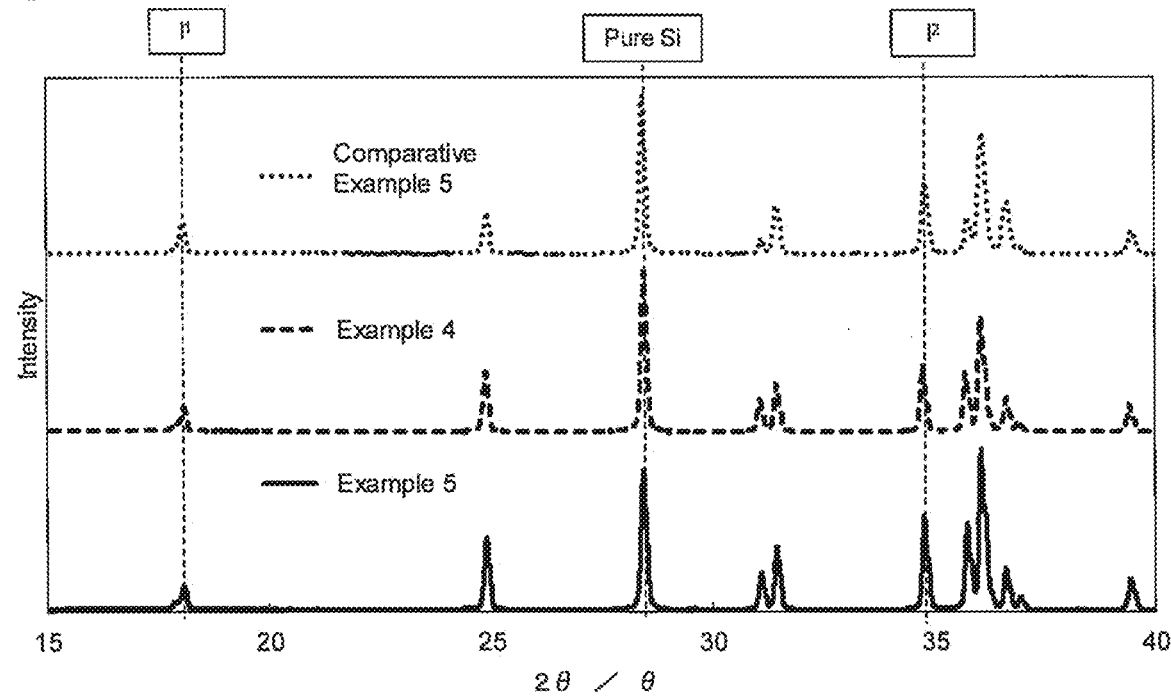
FIG. 6 shows exemplary XRD patterns of nitride phosphors according to Example 4, Example 5, and Comparative Example 5.

For the nitride phosphors obtained as described above, an X-ray diffraction (XRD) pattern was measured by using Ultima IV manufactured by Rigaku Corporation under measurement conditions of a diffraction width of 0.005°, a scanning speed of 0.5°/min, and a rotation of 1 rpm. A CuKα ray (wavelength: 1.54184 Å) was used as an X-ray source. Pure silicon (purity 99.9%, manufactured by Kojundo Chemical) was used as a standard sample so as to accurately identify a peak position. A first peak in a range of 2θ of 17° or more and 19° or less and a second peak in a range of 2θ of 34° or more and 35.5° or less were specified from an obtained XRD pattern, and respective peak intensities were obtained to calculate an intensity ratio ($I^2/I^1$) of the second peak to the first peak. The half-value width of the second peak was obtained from the XRD pattern. The results are shown in Table 2. The XRD patterns of the nitride phosphors of Examples and Comparative Examples are shown in FIGS. 4 to 6.

Powder Emission Characteristics

Emission characteristics of powders of the nitride phosphors were measured by a quantum efficiency measuring device: QE-2000 (manufactured by Otsuka Electronics) with the wavelength of excitation light set to 450 nm. For the nitride phosphors of Example 1, Example 6, and Comparative Example 2, relative emission intensity (relative ENG: %) was obtained by using the emission intensity of the nitride phosphor of Comparative Example 1 as 100%. For the nitride phosphors of Examples 2 and 3 and Comparative Example 4, relative emission intensity (relative ENG: %) was obtained by using the emission intensity of the nitride phosphor of Comparative Example 3 as 100%. For the nitride phosphors of Examples 4 and 5, relative emission intensity (relative ENG: %) was obtained by using the emission intensity of the nitride phosphor of Comparative Example 5 as 100%. For the nitride phosphors of Examples 7 and 8, relative emission intensity (relative ENG: %) was obtained by using the emission intensity of the nitride phosphor of Comparative Example 6 as 100%. The results are shown in Table 2.

LED Emission Characteristics

By combining the fluorescent member 50 including the phosphor 70 obtained by combining the nitride phosphors obtained in Examples 1 to 6 and Comparative Examples 1 to 5 serving as the first phosphor 71 with a phosphor having a composition of $Y_3(Al, Ga)_5O_{12}$:Ce serving as the second phosphor 72 such that chromaticity coordinates (x, y) of emission color are around x=0.435 and y=0.404 (at the color temperature around 3000K) and a resin, with the light emitting element 10 that is an LED having a peak emission wavelength of 455 nm, the light emitting device 100 was produced by a conventional method. A luminous flux was measured for the obtained light emitting device 100. The luminous flux of the light emitting device 100 was measured by using an integral total luminous flux measuring device. For the light emitting devices obtained by using the nitride phosphors of the nitride phosphors of Example 1, Example 6, and Comparative Example 2, a relative luminous flux (relative ye) was obtained by using the luminous flux of the light emitting device obtained by using the nitride phosphor of Comparative Example 1 as 100%. For the light emitting devices obtained by using the nitride phosphors of Examples 2 and 3 and Comparative Example 4, the relative luminous flux (relative ye) was calculated by using the luminous flux of the light emitting device obtained by using the nitride phosphor of Comparative Example 3 as 100%. For the light emitting devices obtained by using the nitride phosphors of the nitride phosphors of Examples 4 and 5, the relative luminous flux (relative ye) was calculated by using the luminous flux of the light emitting device obtained by using the nitride phosphor of Comparative Example 5 as 100%. The results are shown in Table 2.

TABLE 2

| | First peak | | Second peak | | | | Powder | | LED |
|---|---|---|---|---|---|---|---|---|---|
| | Relative intensity ($I^1$) | 2θ (°) | Relative intensity ($I^2$) | 2θ (°) | Half-value width (°) | $I^2/I^1$ | Peak emission wavelength (nm) | Relative ENG | Relative φe |
| Example 1 | 24.6 | 18.1 | 75.2 | 34.7 | 0.0955 | 3.1 | 613 | 103.6 | 100.4 |
| Example 6 | 11.5 | 18.0 | 63.0 | 34.7 | 0.0983 | 5.5 | 611 | 105.1 | 101.8 |
| Comparative Example 1 | 46.2 | 18.1 | 18.5 | 34.7 | 0.1000 | 0.4 | 613 | 100.0 | 100.0 |
| Comparative Example 2 | 39.9 | 18.1 | 35.4 | 34.7 | 0.0946 | 0.9 | 612 | 101.3 | 100.0 |
| Example 2 | 21.8 | 18.1 | 71.4 | 34.7 | 0.0976 | 3.3 | 622 | 101.7 | 100.3 |
| Comparative Example 3 | 48.8 | 18.1 | 32.9 | 34.8 | 0.1134 | 0.7 | 620 | 100.0 | 100.0 |
| Comparative Example 4 | 37.6 | 18.1 | 70.1 | 34.7 | 0.1005 | 1.9 | 621 | 99.7 | 100.0 |
| Example 3 | 24.3 | 18.1 | 102.8 | 34.8 | 0.0974 | 4.2 | 623 | 107.8 | 100.3 |
| Example 4 | 16.0 | 18.1 | 58.0 | 34.7 | 0.0987 | 3.6 | 629 | 105.5 | 101.6 |
| Example 5 | 11.5 | 18.1 | 59.0 | 34.8 | 0.0987 | 5.1 | 629 | 101.0 | 100.2 |
| Comparative Example 5 | 20.2 | 18.1 | 59.2 | 34.8 | 0.1276 | 2.9 | 629 | 100.0 | 100.0 |
| Example 7 | 18.8 | 18.1 | 32.8 | 34.9 | 0.0946 | 1.7 | 629 | 104.8 | — |
| Comparative Example 6 | 10.6 | 18.1 | 45.1 | 35.0 | 0.1908 | 4.3 | 631 | 100.0 | — |
| Example 8 | 8.1 | 18.1 | 23.0 | 34.9 | 0.0980 | 2.8 | 632 | 104.9 | — |

As shown in Table 2, the nitride phosphors of Examples 1 and 6 had higher emission intensities than the nitride phosphors of Comparative Examples 1 and 2 so that the luminous flux became higher in the light emitting device. The nitride phosphors of Examples 2 and 3 had higher emission intensities than the nitride phosphors of Comparative Example 3 so that the luminous flux became higher in the light emitting device. The nitride phosphors of Examples 4 and 5 had higher emission intensities than the nitride phosphors of Comparative Example 5 so that the luminous flux became higher in the light emitting device.

LD Emission Characteristics

By using the nitride phosphors obtained in Examples 7, 8 and Comparative Example 6, a wavelength conversion member as shown in FIG. 9A was produced as follows, and the emission intensity thereof was evaluated. A phosphor paste was prepared by mixing 100 parts by mass of a silicone resin serving as a binder and 167 parts by mass of the nitride phosphor. A metal member made of aluminum and having a plate shape and a disk shape in a planar view from the principal surface side was used as a support. A wavelength conversion layer was formed by arranging the fluorescent paste in an annular shape with a predetermined width along the circumference of the metal member by a printing method on one of the principal surfaces of the support. As a result, the wavelength conversion member was obtained. Table 3 shows the thickness of the phosphor layer of the obtained wavelength conversion member.

The emission intensity of the obtained wavelength conversion member was measured as follows. The disk-shaped wavelength conversion member was fixed to a drive device, and the light emission characteristics were measured while the member is rotated at a rotation speed of 7200 rpm. A laser diode (LD) having a peak emission wavelength of 455 nm was prepared as an excitation light source for the wavelength conversion member, and the output density (W/mm$^2$) of the laser diode was changed stepwise as shown in Table 3 below to measure the emission intensity of emitted light from the wavelength conversion member at each output density in the wavelength range of 590 nm or more and 800 nm or less. The emission intensity was measured by using a Si photodiode manufactured by Hamamatsu Photonics and is shown in Table 3 as the relative emission intensity (relative Po %) based on the emission intensity of the wavelength conversion member using the nitride phosphor obtained in Comparative Example 6 used as a reference (100%).

TABLE 3

| | Phosphor layer thickness | LD output density (W/mm$^2$) | | | |
|---|---|---|---|---|---|
| | (μm) | 8 | 49 | 92 | 132 |
| Comparrative Example 6 | 113 | 100.0 | 100.0 | 100.0 | 100.0 |
| Example 7 | 110 | 108.9 | 109.6 | 113.0 | 113.8 |
| Example 8 | 112 | 109.8 | 110.9 | 114.5 | 115.5 |

Scanning Electron Microscope Observation

Figure 2:
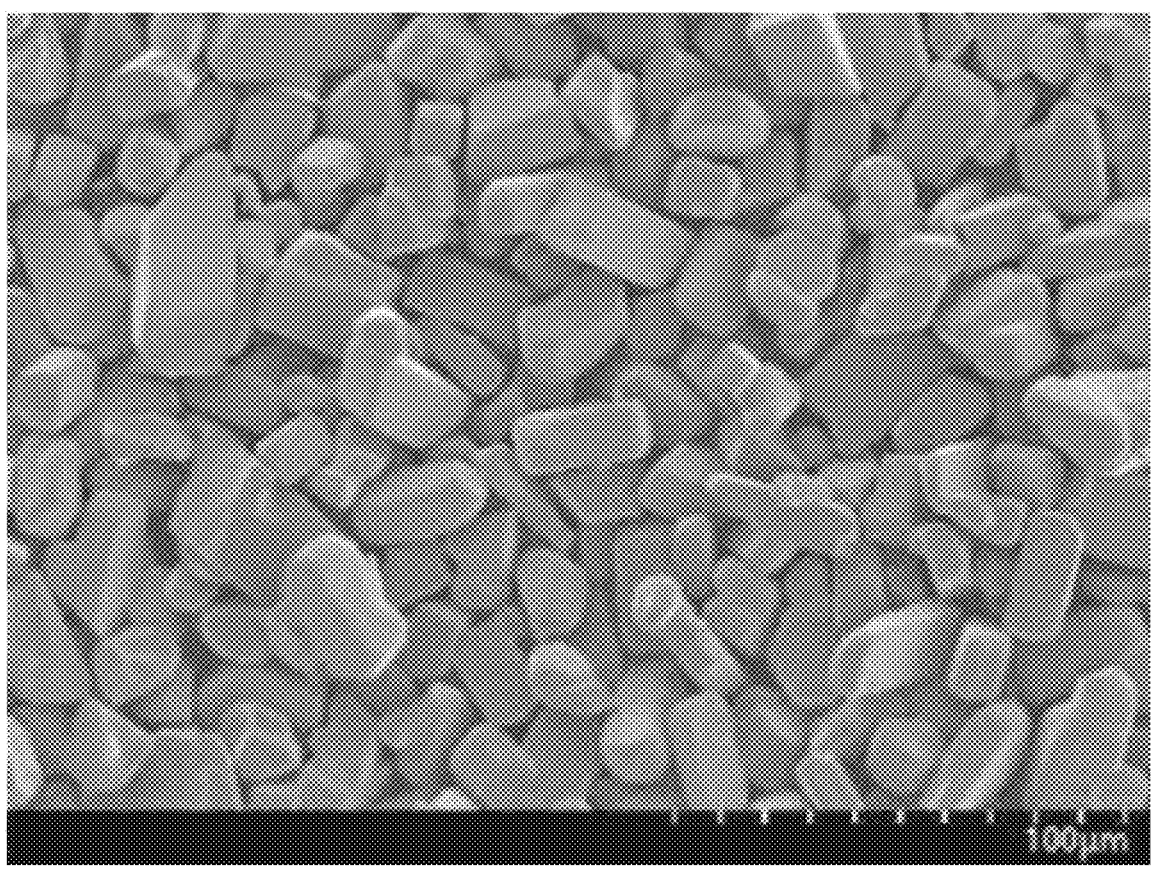
FIG. 2 shows an exemplary scanning electron microscope (SEM) image of a nitride phosphor according to Example 1.
Figure 3:
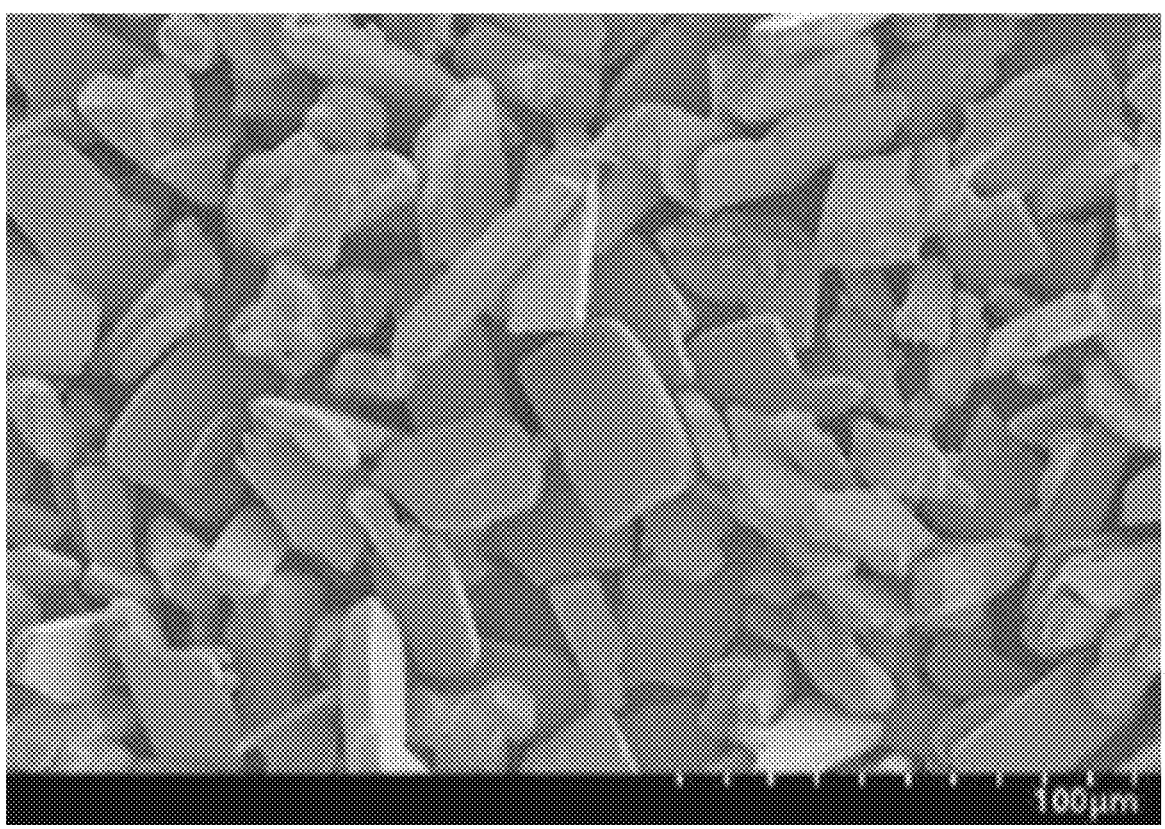
FIG. 3 shows an exemplary SEM image of a nitride phosphor according to Comparative Example 1.

The nitride phosphors obtained in Example 1 and Comparative Example 1 were observed by using a scanning electron microscope (SEM). A SEM image of the nitride phosphor of Example 1 is shown in FIG. 2, and a SEM image of the nitride phosphor of Comparative Example 1 is shown in FIG. 3.

In the nitride phosphor of Example 1, many rod-shaped particles are seen. On the other hand, in the nitride phosphor of Comparative Example 1, many plate-shaped particles are seen. In Examples, as compared to comparative examples, the peak intensity ratio of the second peak to the first peak is larger and the many rod-shaped particles are observed provably because when the nitride phosphor is obtained by heat treatment, the reaction of Sr contained in the raw material mixture with the material of the crucible and the scattering of Sr from the crucible are reduced, and Sr is distributed in the raw material mixture with little unevenness and reacts with the other raw materials almost uniformly. Furthermore, the raw materials react almost uniformly provably because the first-stage and second-stage heat treatments are performed and the fluoride is contained in the raw material mixture. If Sr contained in the raw material mixture reacts with the material of the crucible or Sr scatters from the crucible, Sr is unevenly present in the raw material mixture, it becomes difficult to react uniformly with the other raw materials, so that the composition of the nitride phosphor may contain many defects. When the composition of the nitride phosphor contains many defects, many plate-shaped particles tend to be formed, and the emission intensity probably decreases in the powder containing many plate-shaped particles serving as the nitride phosphor. On the other hand, when the scattering of Sr is reduced, the composition of the nitride phosphor becomes closer to the charged value (theoretical value), and a nitride phosphor having a composition with less defects tends to be obtained. Therefore, it is considered that the emission intensity of the nitride phosphor was increased and the luminous flux of the light emitting device using the nitride phosphor was increased in Examples with reduced scattering of Sr.

The light emitting device using the nitride phosphor of the present disclosure can suitably be used as a light source for lighting etc. Particularly, the light emitting device can suitably be used for a light source for lighting, an LED display, a backlight source for liquid crystal, traffic lights, a lighting switch, various sensors, various indicators, etc., using a light emitting diode as an excitation light source and having extremely excellent light emission characteristics.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

Although the present disclosure has been described with reference to several exemplary embodiments, it is to be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

All publications, patent applications, and technical standards mentioned in this specification are herein incorporated by reference to the same extent as if each individual publication, patent application, or technical standard was specifically and individually indicated to be incorporated by reference.

What is claimed is:

1. A method for manufacturing a nitride phosphor having a composition containing Eu, Si, Al, N, and a group 2 element comprising at least one selected from the group consisting of Mg, Ca, Sr, and Ba,
the composition having a ratio of a total molar content of the group 2 element and Eu to a molar content of Al of 0.8 or more and 1.1 or less, a molar ratio of Eu of 0.002 or more and 0.08 or less, a molar ratio of Si of 0.8 or more and 1.2 or less, and a total molar ratio of Si and Al of 1.8 or more and 2.2 or less, the method comprising:
performing a first heat treatment of a raw material mixture containing a group 2 element source, an Eu source, a Si source, and an Al source in a closed container made of tungsten at a temperature of 1200° C. or higher and 1600° C. or lower to obtain a first heat-treated product; and
performing a second heat treatment of the first heat-treated product in a closed container made of tungsten at a temperature of 1800° C. or higher and 2100° C. or lower to obtain a second heat-treated product.

2. The method for manufacturing a nitride phosphor according to claim 1, further comprising performing a cracking treatment of the first heat-treated product before the second heat treatment.

3. The method for manufacturing a nitride phosphor according to claim 1, wherein the raw material mixture further contains a metal fluoride.

4. A method for manufacturing a nitride phosphor having a composition containing Eu, Si, Al, N and a group 2 element comprising at least one selected from the group consisting of Mg, Ca, Sr, and Ba,
the composition having a ratio of a total molar content of the group 2 element and Eu to a molar content of Al of 0.8 or more and 1.1 or less, a molar ratio of Eu of 0.002 or more and 0.08 or less, a molar ratio of Si of 0.8 or more and 1.2 or less, and a total molar ratio of Si and Al of 1.8 or more and 2.2 or less, the method comprising:
performing a heat treatment of a raw material mixture containing a group 2 element source, an Eu source, a Si source, an Al source, and a metal fluoride in a closed container made of tungsten at a temperature of 1800° C. or higher and 2100° C. or lower to obtain a heat-treated product.

5. The method for manufacturing a nitride phosphor according to claim 4, further comprising performing a heat treatment of the raw material mixture at a temperature of 1200° C. or higher and 1800° C. or lower in a closed container made of tungsten before performing the heat treatment at a temperature of 1800° C. or higher and 2100° C. or lower.

6. The method for manufacturing a nitride phosphor according to claim 1, wherein the nitride phosphor has a composition represented by Formula (I):

$$M^a{}_s Sr_t Eu_u Si_v Al_w N_x,\qquad(\mathrm{I})$$

wherein, in Formula (I), $M^a$ is the group 2 element comprising at least one selected from the group consisting of Mg, Ca, and Ba, and s, t, u, v, w, and x satisfy $0<s<1$, $0\leq t<1$, $0.002\leq u\leq 0.08$, $0.8\leq s+t+u\leq 0.1$, $0.8\leq v\leq 1.2$, $0.8\leq w\leq 1.2$, $1.8\leq v+w\leq 2.2$, $2.5\leq x\leq 3.2$.

7. The method for manufacturing a nitride phosphor according to claim 4, wherein the nitride phosphor has a composition represented by Formula (I):

$$M^a{}_s Sr_t Eu_u Si_v Al_w N_x,\qquad(\mathrm{I})$$

wherein, in Formula (I), $M^a$ is the group 2 element comprising at least one selected from the group consisting of Mg, Ca, and Ba, and s, t, u, v, w, and x satisfy $0<s<1$, $0\leq t<1$, $0.002\leq u\leq 0.08$, $0.8\leq s+t+u\leq 0.1$, $0.8\leq v\leq 1.2$, $0.8\leq w\leq 1.2$, $1.8\leq v+w\leq 2.2$, $2.5\leq x\leq 3.2$.

* * * * *